United States Patent [19]

Bailey

[11] Patent Number: 5,794,889
[45] Date of Patent: Aug. 18, 1998

[54] FIRE RETARDANT DELIVERY SYSTEM

[75] Inventor: James D. Bailey, Tucson, Ariz.

[73] Assignee: Raytheon Company, Los Angeles, Calif.

[21] Appl. No.: 469,337

[22] Filed: Jun. 6, 1995

[51] Int. Cl.$^6$ .............. B64D 1/16; B64D 45/00; A62C 3/02; A62C 35/38

[52] U.S. Cl. .............. 244/136; 244/129.2; 169/62; 169/47

[58] Field of Search ............... 244/129.2, 136; 169/62, 47

[56] References Cited

U.S. PATENT DOCUMENTS

| | | | |
|---|---|---|---|
| 4,936,389 | 6/1990 | MacDonald et al. | 244/136 |
| 5,274,236 | 12/1993 | Pascale et al. | 244/3.16 |
| 5,549,259 | 8/1996 | Herlik | 244/136 |

*Primary Examiner*—Virna Lissi Mojica
*Attorney, Agent, or Firm*—David W. Collins; Leonard A. Alkov; Glenn H. Lenzen, Jr.

[57] ABSTRACT

A fire retardant delivery system for delivering fire retardant onto a fire. The system 10 includes an aircraft comprises a fire retardant storage and ejection system, and a stabilized three axis gimbal system for providing signals indicative of angle and angle rates of a gimbal with respect to an axis of the aircraft. An infrared sensor system is disposed on stabilized three axis gimbal system. A display is coupled to infrared sensor system for displaying an image produced thereby to a pilot of the aircraft. Aircraft sensors are provide signals indicative of the velocity, altitude, and dive angle of the aircraft. A computer is coupled to the infrared sensor system, to the aircraft sensors, and to the fire retardant storage and ejection system, for computing distance between the aircraft and a hot spot in the fire and for computing an optimal release point for ejecting fire retardant from the aircraft onto the fire.

3 Claims, 3 Drawing Sheets

FIRE RETARDANT DELIVERY SYSTEM

BACKGROUND

The present invention relates generally to fire retardant delivery systems, and more particularly to a fire retardant delivery system for delivering fire retardant to suppress forest fires, and the like.

The presently used method of aerial delivery of fire retardant employs retardant carrying aircraft that are flown above a forest fire, a target hot spot is determined, and the fire retardant is dropped from the aircraft in advance of the hot spot so that it lands on the hot spot. The presently used method of aerial retardant delivery lacks accuracy and has operating limitations that restrict its use. In particular, if the fire produces a great deal of dense smoke, it is difficult for pilots to accurately target the desired hot spot due to lack of visibility. Furthermore, fighting fires at night is generally limited due to the lack of visibility. As a result it is not as effective in assisting the ground crews nor is it as cost effective as could be achieved.

Heavy aircraft are a major component of the forest fire fighting arsenal. Present aerial fire retardant delivery techniques rely upon the "seat of the pants" skill of the pilot and crew. The effectiveness of the delivery of fire retardant depends upon hitting hot spots with the right concentration of liquid. Release of this liquid is very dependent upon the velocity, dive angle, and altitude of the aircraft above the terrain. In addition, the forest fire area has smoke obscuration which imposes terrain impact or midair collision safety problems.

Therefore, it is an objective of the present invention to provide an improved fire retardant delivery system for delivering fire retardant to suppress forest fires, and the like.

SUMMARY OF THE INVENTION

In order to meet the above and other objectives, the present invention is a fire retardant delivery system for delivering fire retardant onto a fire. The system includes an aircraft comprises a fire retardant storage and ejection system, and a stabilized three axis gimbal system for providing signals indicative of angle and angle rates of a gimbal with respect to an axis of the aircraft. An infrared sensor system is disposed on stabilized three axis gimbal system. A display is coupled to infrared sensor system for displaying an image produced thereby to a pilot of the aircraft. Aircraft sensors provide signals indicative of the velocity, altitude, and dive angle of the aircraft. A computer is coupled to the infrared sensor system, to the aircraft sensors, and to the fire retardant storage and ejection system, for computing distance between the aircraft and a hot spot in the fire and for computing an optimal release point for ejecting fire retardant from the aircraft onto the fire.

The present invention adapts technology that was originally developed for military applications to provide for improved aerial delivery of liquid and other fire retardants to suppress forest fires. Infrared imaging, automatic scene tracking, range measurement by angle rate sensing, and high speed computational processing are combined in the present invention to provide for optimal dropping of fire retarding liquids to improve their effectiveness and to increase the safety of the delivery aircraft and crew.

Implementation of the present invention provides measurement techniques and computation that provide for predictable and repeatable fire retardant release, thereby eliminating the "seat of the pants" methods conventionally employed. In addition, the infrared sensor and associated TV display employed in the present invention enhance the visibility of pilots and the safety of the crew. Ancillary benefits are that the present invention provides the ability for a fire coordinator to accurately assess the complete hot spot situation, the capability to continue accurate and safe delivery of retardants at night or during other periods of low visibility, and the reduction in the number of flights (and cost) required to suppress a forest fire. Moreover, it may be possible to suppress small isolated fires before they spread or require attention by ground personnel by using the present fire retardant delivery system to more accurately deliver fire retardant onto the fire.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
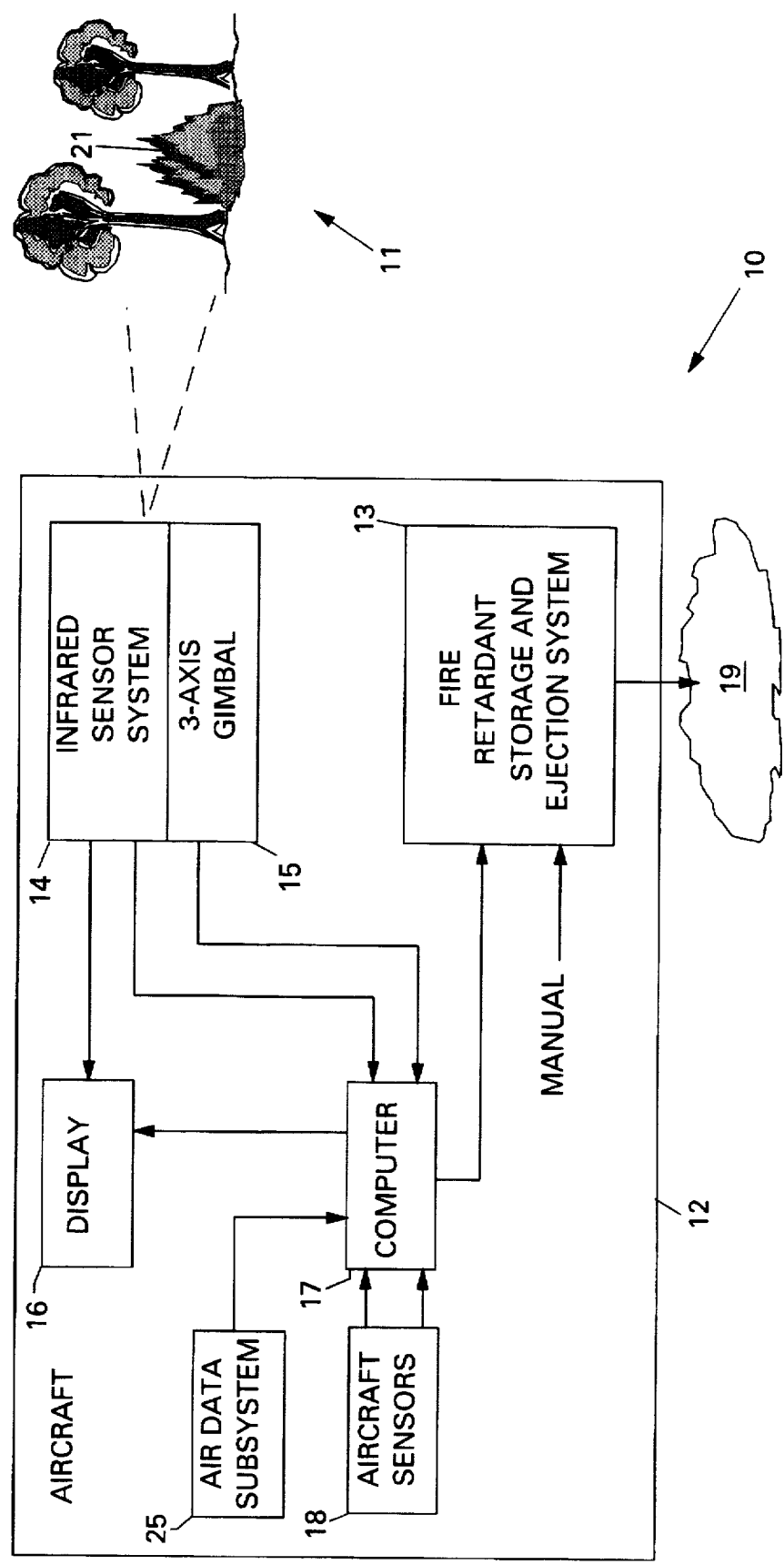
FIG. 1 is a block diagram of a fire retardant delivery system in accordance with the principles of the present invention.

Referring to the drawing figures, FIG. 1 is a block diagram of a fire retardant delivery system 10 in accordance with the principles of the present invention for suppressing fires 11, such as a forest fire 11, and the like. The fire retardant delivery system 10 comprises an aircraft 12 having a fire retardant storage and ejection system 13, an infrared sensor system 14 disposed on a stabilized three axis gimbal system 15, a display 16 coupled to infrared sensor system 14 for displaying an image produced thereby to a pilot or crew of the aircraft 12, a computer 17 coupled to the infrared sensor system 14, to aircraft sensors 18, and the fire retardant storage and ejection system 13, for computing the distance between the aircraft 12 and a hot spot 21 in the fire 11 and other aircraft parameters that permit the computation of an optimal release point 22 for ejecting fire retardant 19 from the aircraft 12.

The aircraft sensors 18 include sensors for providing the velocity, altitude, and dive angle of the aircraft 12 and outputs signals indicative thereof that are applied to the computer 17. The three axis gimbal system 15 measures the angle and angle rates of a gimbal with respect to an axis of the aircraft 12 and outputs signals indicative thereof that are applied to the computer 17. The computer 17 computes the optimal release point 22 for releasing the fire retardant 19 and sends a signal to the fire retardant storage and ejection system 13 that automatically releases the fire retardant. Alternatively, a start signal may be provided to the pilot providing an indication to manually release the fire retardant 19. The details of the fire retardant delivery system 10 will be discussed with reference to FIGS. 2-4.

Figure 2:
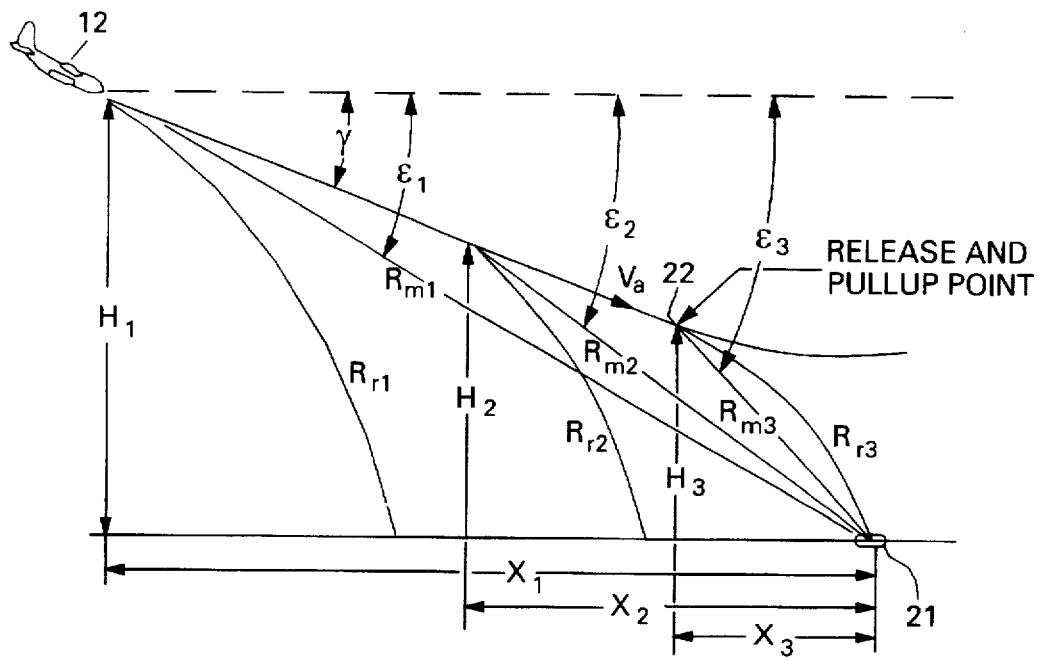
FIG. 2 shows the vertical plane geometry associated with the fire retardant delivery system that is useful in explaining its operation.

FIG. 2 shows the vertical plane geometry associated with the fire retardant delivery system 10 that is useful in explaining its operation. FIG. 2 illustrates the principles of the present invention for a no-wind vertical plane geometry using a drag-free falling object. A line of sight range Rmn between the aircraft 12 and the hot spot 21 is measured using the aircraft velocity Va and the line of sight angular rotation rate εn in accordance with the equation:

$$Rmn = \frac{Va \sin(\varepsilon n - \gamma)}{\varepsilon n}$$

Three retardant ballistic equations are continuously computed in the computer 17 during the approach to the release point 22. These equations are:

$$Rrn = SQRT((Xrn^2 + Hrn^2))$$

$$Hrn = 0.5 \, g \, tn^2 + Va \sin \gamma, \text{ and}$$

$$Xrn = Va \, tn \cos \gamma,$$

where

Hrn is the height above the target hot spot 21 at the nth computation

Xrn is the horizontal component trajectory of the retardant 19 tn is the time from release of the retardant 19 to impact g is the gravity constant of 32.2 feet per second$^2$ εn is the measured dive angle of the aircraft 12

γ is the measured line of sight angle to the hot spot 21

Va is the measured true airspeed of the aircraft 12, and $\dot{\varepsilon}n$ is the measured line of sight angle rate.

Rrn in FIG. 2 represents idealized trajectories of a drag-free object if it is released at the time of computation n. When the measured Rmn is equal to the ballistic range Rrn of the retardant 19, the optimum release point 22 is attained and the target hot spot 21 will be impacted by the retardant 19 if it is released at this point. Of course there are drag affects due to the mass of the retardant 19 and these are also part of the computation performed in the computer 17. Computation is performed continuously along the aircraft flight path. Iterative computation cycles greater than 10 per second provide adequate accuracy for computation of the proper release point 22.

The height Hrn above the target hot spot 21 is computed and is therefore independent of altimeter barometric uncertainties and unknown target altitude. If the altitude of the hot spot 21 is known a priori, then barometric altitude may be used to initialize the iterative computations. Also, because of the rapid iterative calculations that are made, it is not necessary for aircraft parameters such as γ and Va to be held constant during the approach to the target hot spot 21. For each computation iteration, azimuth steering and a time-to-go value are computed to provide information to the pilot. The relative target-to-aircraft altitude is used to alert the pilot of a pull-up requirement to prevent collision of the aircraft 12 with the ground if the optimum release point 22 has not been reached.

Figure 3:
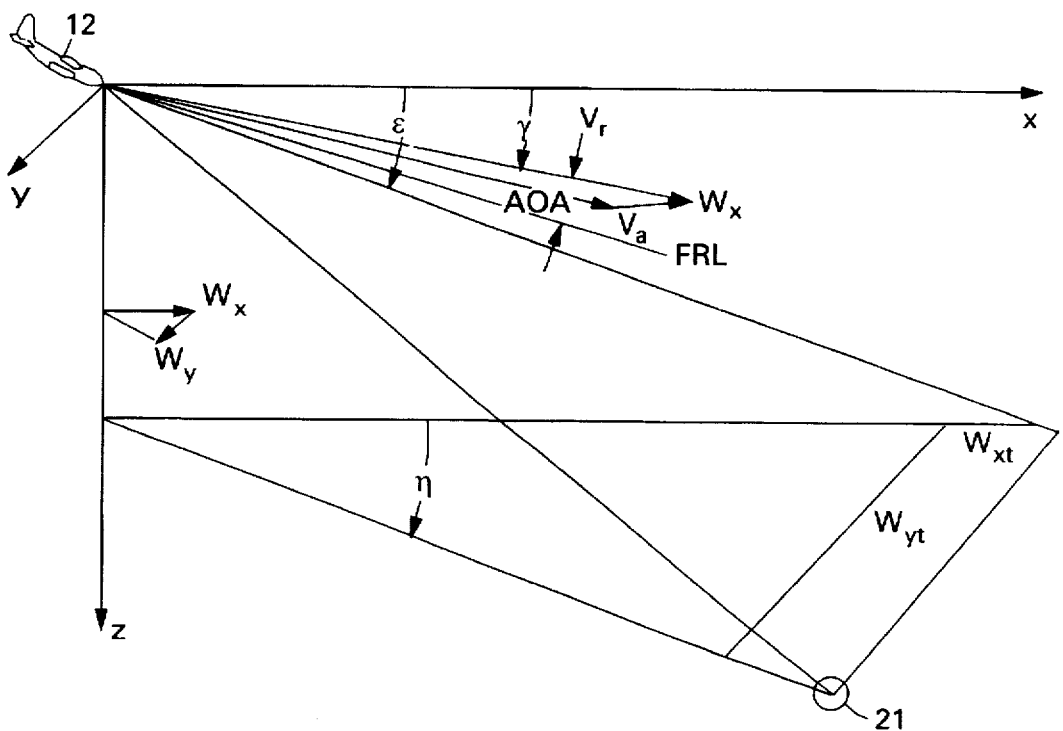
FIG. 3 shows the three dimensional geometry associated with the fire retardant delivery system that is useful in explaining its operation under complex conditions.

While the above single geometric plane description is adequate to illustrate the principles of the present invention, the actual implementation is more complex. FIG. 3 shows the three dimensional geometry associated with the fire retardant delivery system 10 that is useful in explaining its operation under complex conditions. Consideration is given to non-idealized factors such as cross plane (three-dimensional) geometry, relative wind that affects aircraft track and retardant trajectories, and the effect of aircraft angle of attack (AOA) on aircraft flight path velocity Va. These considerations are illustrated in FIG. 3. The geometry arithmetic may be derived from FIG. 3 in a manner similar to the vertical plane illustration described with reference to FIG. 2.

When the infrared sensor system 14 is locked-on, the gimbal system 15 is ground stabilized to provide inputs to the computation cycle performed in the computer 17. The three axis gimbal system 15 measures the angles and angle rates of the aircraft 12 in azimuth, elevation, and roll. Accurate aircraft data such as angle of attack, pitch angle, true airspeed, and acceleration are required. If these are not available from available aircraft instruments (sensors 18), they may be incorporated into an air data subsystem 25 that is part of the fire retardant delivery system 10.

In addition, cockpit controls are provided as part of the fire retardant delivery system 10 to issue commands such as power, slew/track sensor command issued to the infrared sensor system 14, retardant release automatic/manual issued to the fire retardant storage and ejection system, delivery mode select command to selectively provide a computed impact point or a computed release range, and TV monitor commands for controlling the display 16.

Figure 4:
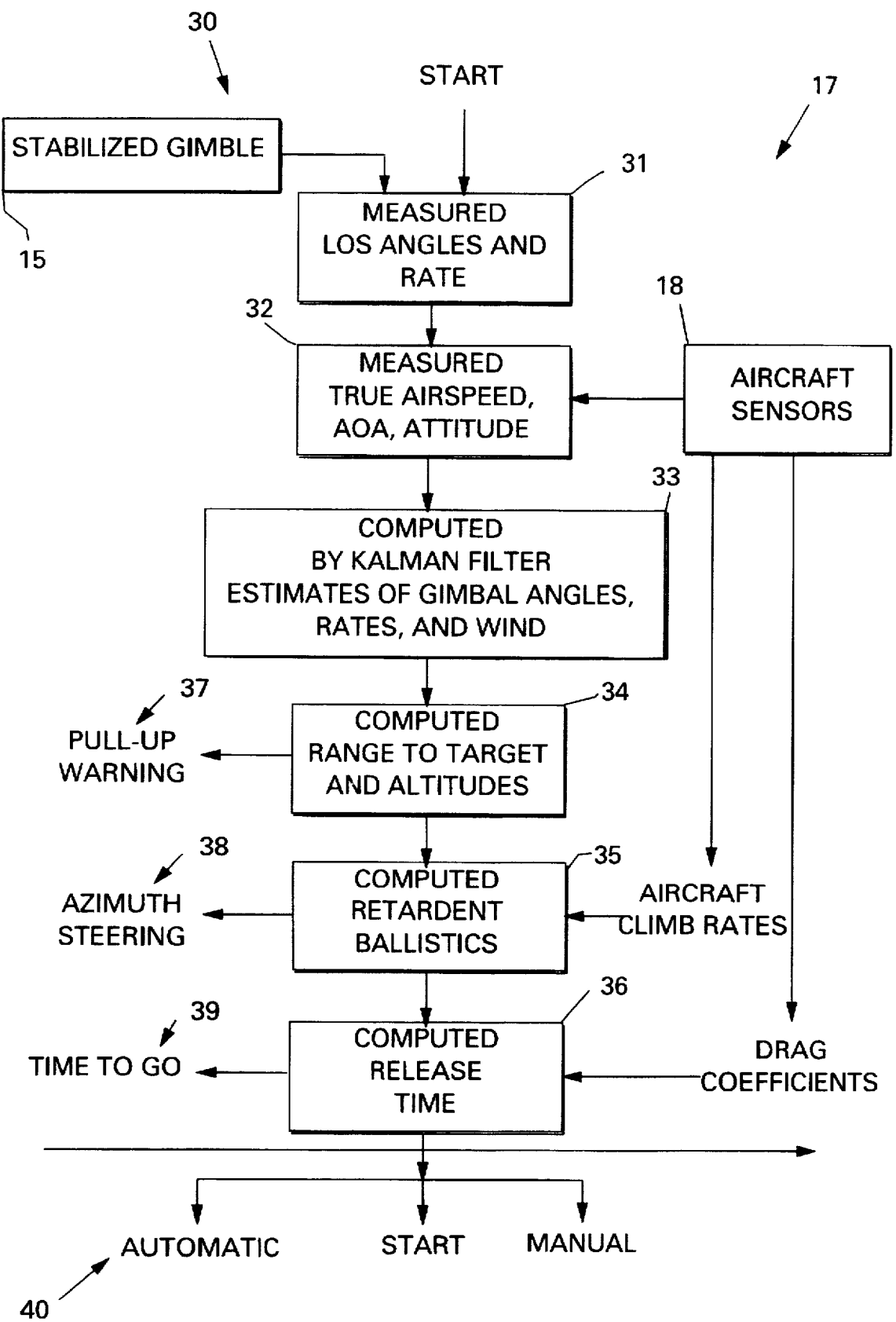
FIG. 4 is a simplified computational flow diagram for a computation cycle employed in the fire retardant delivery system of FIG. 1.

FIG. 4 is a simplified computational flow diagram for a processing method 30 employed in the fire retardant delivery system 10 of FIG. 1. FIG. 4 shows a computation cycle performed in the processing method 30 once the hot spot 21 has been selected and is locked-on by the infrared sensor system 14. The process flow is as follows.

The processing method 30 starts by inputting measured line of sight angles and angle rates from the stabilized gimbal system 15, as indicated in step 31. The aircraft sensors 18 are polled to input the measured true airspeed, angle of attack, and attitude of the aircraft 12, as indicated in step 32. Then estimates of gimbal angles, rates and wind speed and direction are then computed using Kalman filters, for example, as indicated in step 33. Then the range to the target hot spot 21 and altitude of the aircraft 12 are computed in response to the computed gimbal angles, rates and wind speed and direction and the aircraft climb rate derived from the aircraft sensors 18, as indicated in step 34. A pull-up warning signal is output if the computations indicate that the aircraft 12 will hit the ground if it flies through the desired release point 22, given its current attitude and speed. Retardant ballistics are then computed using the computed range to the target hot spot 21 and altitude of the aircraft 12 and the drag coefficients derived from the aircraft sensors 18, as indicated in step 35. Azimuth steering signals are output to steer the aircraft 12 to the release point 22. The release time and release point 22 are then computed, as indicated in step 36, and a time-to-go output signal is provided to the pilot. The processing method 30 outputs automatic control signals after computing the release time for automatically releasing retardant 19 from the fire retardant storage and ejection system 13, and start and manual control signals that allow the pilot to manually control the release of the retardant 19 from the fire retardant storage and ejection system 13.

The fire retardant delivery system 10 is based upon a system known as the Angle Rate Bombing Set (ARBS) which was developed by the assignee of the present invention and was fielded on A-4M and AV-8B aircraft used by the U.S. Navy and GR MK-5 aircraft used by the United Kingdom. However, the ARBS system only used a TV camera, which lacks the capability of viewing through smoke or during night operation. Production of the ARBS system ceased in 1991. There are no other known systems that perform comparable functions.

In operation, hot spots in a forest fire, for example, are detected and tracked from the aircraft 12 using the infrared sensor system 14 disposed on the stabilized three axis gimbal system 15. In addition to sensing the hot spots 21, the infrared sensor system 14 provides a video output signal to a TV-type display 16 that permits the pilot and crew to see through the smoke obscuration to enhance flight safety. The stabilized three axis gimbal system 15 measures the angle and angle rates of the gimbal with respect to the axis of the aircraft 12. These measurements are provided as inputs to a software program that runs in the computer 17 that computes the distance to the hot spot 21 and wind effects upon the aircraft 12. The distance to the hot spot 21 is compared to trajectories for fire retardant release as a function of aircraft velocity, altitude, and dive angle. The outputs of this computation process performed in the computer 17 provides cues for the pilot to control the aircraft 12 and the optimum time to release the retardant 19. When the range to the hot spot 21 equals the starting point for the for the optimum trajectory for the released fire retardant 19, a direct hit on the hot spot 21 area will result.

The angle rate measurement of range has been heretofore utilized in military systems to obtain target data for weapon control purposes. Recent advances in infrared sensors, accurate angle transducers, and small digital computers provide the ability to implement the present fire retardant delivery system described herein. Angle rate delivery of projectiles from high speed maneuvering aircraft has been successfully demonstrated.

Thus there has been described new and improved fire retardant delivery system for delivering fire retardant to suppress forest fires, and the like. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A fire retardant delivery system for delivering fire retardant onto a fire, said system comprising:

an aircraft;

a fire retardant storage and ejection system disposed on the aircraft;

a stabilized three axis gimbal system disposed on the aircraft for providing signals indicative of angle and angle rates of a gimbal with respect to an axis of the aircraft;

an infrared sensor system disposed on the stabilized three axis gimbal system;

a display coupled to the infrared sensor system for displaying an image produced thereby to a pilot of the aircraft;

aircraft sensors disposed on the aircraft for providing signals indicative of the velocity, altitude, and dive angle of the aircraft;

a computer coupled to the infrared sensor system, to the aircraft sensors, and to the fire retardant storage and ejection system, for computing a line of sight distance Rmn between the aircraft and the hot spot using aircraft velocity Va and line of sight angular rotation rate ∈n in accordance with the equation:

$$Rmn = \frac{Va \sin(\epsilon n - \gamma)}{\epsilon n}$$

for computing an optimal release point for ejecting fire retardant from the aircraft onto the fire and for outputting a start signal to the pilot providing an indication to manually release the fire retardant.

2. The system of claim 1 wherein the computer computes three retardant ballistic equations while the aircraft approaches the release point given by:

$Rrn = SQRT((Xrn^2 + Hrn^2))$ $Hrn = 0.5g \ tn^2 + Va \sin \gamma$, and $Xrn = Va \ tn \cos \gamma$, where Hrn is the height above the target hot spot at the nth computation, Xrn is the horizontal component trajectory of the retardant, tn is the time from release of the retardant to impact, g is the gravity constant of 32.2 feet per second$^2$, ∈n is the measured dive angle of the aircraft, γ is the measured line of sight angle to the hot spot, Va is the measured true airspeed of the aircraft, and ∈n is the measured line of sight angle rate.

3. A fire retardant delivery system for delivering fire retardant onto a fire, said system comprising:

an aircraft;

a fire retardant storage and ejection system disposed on the aircraft;

a stabilized three axis gimbal system disposed on the aircraft for providing signals indicative of angle and angle rates of a gimbal with respect to an axis of the aircraft;

an infrared sensor system disposed on the stabilized three axis gimbal system;

a display coupled to the infrared sensor system for displaying an image produced thereby to a pilot of the aircraft;

aircraft sensors disposed on the aircraft for providing signals indicative of the velocity, altitude, and dive angle of the aircraft;

a computer coupled to the infrared sensor system, to the aircraft sensors, and to the fire retardant storage and ejection system, for computing distance between the aircraft and a hot spot in the fire and for computing an optimal release point for ejecting fire retardant from the aircraft onto the fire;

and wherein the computer computes the distance between the aircraft and a hot spot and computes the optimal release point by:

inputting measured line of sight angles and angle rates from the stabilized gimbal system;

polling the aircraft sensors to input the measured true airspeed, angle of attack, and attitude of the aircraft;

computing estimates of gimbal angles, rates and wind speed and direction using Kalman filters;

computing the range to the target hot spot and altitude of the aircraft in response to the computed gimbal angles, rates and wind speed and direction and the aircraft climb rate derived from the aircraft sensors;

outputting a pull-up warning signal if the computations indicate that the aircraft will hit the ground if it flies through the desired release point, given its current attitude and speed;

computing retardant ballistics using the computed range to the target hot spot and altitude of the aircraft and the drag coefficients derived from the aircraft sensors;

outputting azimuth steering signals to steer the aircraft to the release point;

computing the release time at which retardant should be released;

outputting a time-to-go output signal is provided to the pilot; and outputting automatic control signals after computing the release time for automatically releasing retardant and start and manual control signals that allow the pilot to manually control the release of the retardant.

* * * * *